(12) United States Patent
Boesche et al.

(10) Patent No.: US 11,628,893 B2
(45) Date of Patent: Apr. 18, 2023

(54) REAR SPOILER DEVICE FOR A MOTOR VEHICLE

(71) Applicant: VOLKSWAGEN AKTIENGESELLSCHAFT, Wolfsburg (DE)

(72) Inventors: Thorben Boesche, Wolfsburg (DE); Christian Baer, Roitzsch (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 49 days.

(21) Appl. No.: 17/195,700

(22) Filed: Mar. 9, 2021

(65) Prior Publication Data
US 2021/0284255 A1 Sep. 16, 2021

(30) Foreign Application Priority Data
Mar. 13, 2020 (DE) .......................... 102020203294.7

(51) Int. Cl.
*B62D 35/00* (2006.01)
(52) U.S. Cl.
CPC ................. *B62D 35/007* (2013.01)
(58) Field of Classification Search
CPC .............. B62D 35/007; Y02T 10/82
See application file for complete search history.

(56) References Cited

U.S. PATENT DOCUMENTS

2020/0122787 A1\* 4/2020 Grajek ................. B62D 35/007
2021/0155138 A1\* 5/2021 Schellens ............... B60N 3/001

FOREIGN PATENT DOCUMENTS

DE 102018207801 A1 11/2019
WO WO-2019122460 A1 \* 6/2019

\* cited by examiner

*Primary Examiner* — Lori L Lyjak
(74) *Attorney, Agent, or Firm* — Laurence A. Greenberg; Werner H. Stemer; Ralph E. Locher

(57) ABSTRACT

A rear spoiler device for a motor vehicle contains an upper shell which has an air-guiding outer wall. The upper shell extends longitudinally from a leading edge to a trailing edge and has a central main part and two side parts. The side parts are oriented so as to be inclined relative to the main part and are integrally connected to the main part on a longitudinally extending folded edge. A carrier element is provided which is fastenable to the motor vehicle and which has at least one retaining tab for fastening the upper shell. It is provided that a fastening tab which protrudes in the direction of the retaining tab of the carrier element and which extends along the folded edge is arranged on the inner face of the upper shell remote from the air-guiding outer wall.

10 Claims, 3 Drawing Sheets

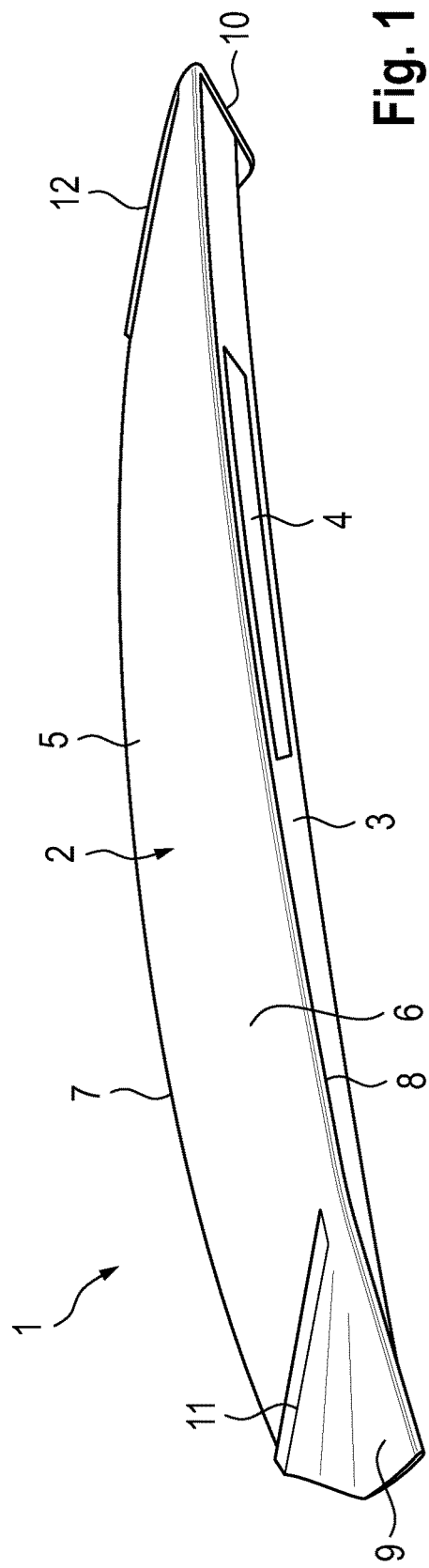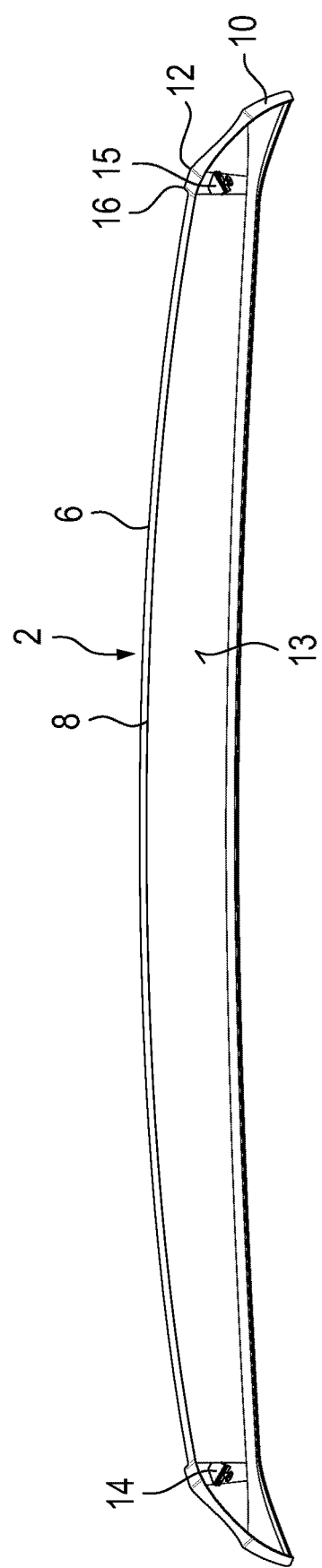

REAR SPOILER DEVICE FOR A MOTOR VEHICLE

CROSS-REFERENCE TO RELATED APPLICATION

This application claims the priority, under 35 U.S.C. § 119, of German patent application DE 10 2020 203 294.7, filed Mar. 13, 2020; the prior application is herewith incorporated by reference in its entirety.

BACKGROUND OF THE INVENTION

Field of the Invention

The invention relates to a rear spoiler device for a motor vehicle, containing an upper shell which has an air-guiding outer wall. The upper shell extends longitudinally from a leading edge to a trailing edge and has a central main part and two side parts adjoining the main part in the width extension. The side parts are oriented so as to be inclined relative to the main part and are integrally connected to the main part on a longitudinally extending folded edge. A carrier element is provided which is fastenable to the motor vehicle and which has at least one retaining tab for fastening the upper shell.

Rear spoiler devices of the type mentioned in the introduction are known from the prior art. Known rear spoiler devices have an upper shell which is fastened to a carrier part which serves for retaining and reinforcing the upper shell. The carrier element in this case is fastenable, for example, to the motor vehicle on an add-on part of the motor vehicle. In order to ensure the fixed attachment of the upper shell to the carrier element, it is frequently adhesively bonded or screwed to the carrier element. Retaining portions, which in some cases are additionally provided therefor and which serve for receiving a screw or a further fastening element, are provided for the screw connection. For advantageous air guidance, it is also known to shape the upper shell such that in terms of its outer contour it follows a roof line of the motor vehicle or lengthens this roof line of the motor vehicle on which the rear spoiler device is to be arranged. In this case, the known upper shells also have side parts which, starting from a main part or roof portion which lengthens the roof, extend downwardly to the side parallel to the side walls of the motor vehicle and/or of the body of the motor vehicle. As a result, in a plan view the rear spoiler device attains a reverse U-shape in the longitudinal extension. The side parts in this case also serve as an air-guiding element and improve the air flow behavior and also advantageously support the rear spoiler on the motor vehicle. By the suitable arrangement of the side parts relative to the main part, folded edges which extend longitudinally, i.e. also from the leading edge to the trailing edge, in particular in the extension of the roof line of the motor vehicle, are produced in the upper shell.

BRIEF SUMMARY OF THE INVENTION

The object of the invention is to provide an improved rear spoiler device in which the permanently fixed connection is advantageously ensured between the upper shell and the carrier element.

The object of the invention is achieved by a rear spoiler device having the features of the independent claim. This has the advantage that by means of an advantageous configuration of a connecting point of the upper shell and the carrier element, an advantageous producibility, in particular of the upper shell, is ensured and the fastening of the upper shell to the carrier element is improved thereby. According to the invention, this is achieved in that a fastening tab, which protrudes in the direction of the retaining portion of the carrier element and which extends along the folded edge, is arranged on the inner face of the upper shell remote from the air-guiding outer wall and/or on the inner face of the upper shell facing the carrier element. The fastening tab thus protrudes from the upper shell in the direction of the carrier element. In this case the fastening tab extends along the folded edge so that the fastening tab is oriented parallel to the folded edge. By the arrangement of the fastening tab on the folded edge and the orientation along the folded edge it is achieved that the fastening tab may be configured integrally with the upper shell without sink marks being produced thereby, for example in the case of an injection-molding process, on the externally visible region of the folded edge on the air-guiding outer wall.

Preferably the fastening tab is thus integrally configured with the upper shell, wherein the upper shell is preferably produced as an injection-molded part. As a result, a simple mounting of the rear spoiler device is ensured as a whole, due to a reduced number of parts and a durable and robust fastening of the upper shell to the carrier element.

It is also preferably provided that the fastening tab extends only partially along the folded edge. Thus the fastening tab does not extend along the entire folded edge but only over a portion thereof, in particular over a portion which is significantly smaller than the length of the folded edge, in particular less than half, particularly preferably less than a quarter, of the length. The length of the fastening tab along the folded edge in this case is selected, in particular, as a function of the loads which are to be anticipated and which are to be received by the connection. As the fastening tab does not extend over the entire length of the folded edge, a simple demolding of the upper shell from the injection-molding tool and a weight-saving design of the upper shell is ensured as a whole.

It is further preferably provided that the fastening tab extends parallel to the retaining tab of the carrier element. In the assembled state, therefore, when the upper shell bears against the carrier element, the fastening tab and the retaining tab extend parallel to one another, whereby the fastening tab and the retaining tab are able to be permanently connected together in a simple manner by a screw connection, for example.

Particularly preferably, the fastening tab is assigned two lateral support tabs which extend perpendicular to the folded edge from the upper shell in the direction of the carrier part, so that the fastening tab forms a U-shaped profile with the support tabs. As a result, the fastening tab is reinforced and supported relative to its orientation to the upper shell, so that high loads may be transmitted without the fastening tab being deformed or twisted.

Particularly preferably, the fastening tab is integrally configured with the support tabs. This results in a robust design of the fastening tab in the manner of a trough-shaped fastening dome. Moreover, this preferably results in the fastening dome as a whole being integrally configured with the upper shell.

According to a preferred development of the invention, the fastening tab and the retaining tab are connected together by a screw connection. As a result, a secure, permanent and, in particular, also releasable connection of the carrier element and the upper shell is ensured, providing advantages relative to maintenance options, for example.

Moreover, it is preferably provided that a screw thread is arranged on the fastening tab and an opening which is aligned with the screw thread for receiving a threaded shank of a fastening screw is arranged in the retaining tab. Thus a fastening screw may be guided through the opening and screwed into the screw thread of the retaining tab, so that a screw head of the fastening screw bears against the side of the retaining tab remote from the fastening tab and as a result the carrier element and the upper shell are braced relative to one another. According to an alternative embodiment of the invention, the screw thread is configured on the retaining tab and the opening is configured on the fastening tab.

Preferably, the screw thread is integrally configured with the fastening tab or is fastened as a separate element to the fastening tab. In the case of an integral design the screw thread, in particular, is cut into or shaped into the fastening tab, so that the fastening screw is able to be directly screwed into the fastening tab. The same applies in the case when the screw thread is configured in the retaining tab. If the screw thread is configured as a separate element, for example as a threaded sleeve, threaded bushing or threaded nut, it is advantageously fastened to the fastening tab, for example, by being encapsulated by injection-molding of the material of the fastening tab in order to ensure a permanent connection.

Particularly preferably, a cage nut is fastened to the fastening tab, the cage nut thus providing a separately configured screw thread and permitting a simple mounting of the screw thread on the fastening tab or similarly on the retaining tab.

Other features which are considered as characteristic for the invention are set forth in the appended claims.

Although the invention is illustrated and described herein as embodied in a rear spoiler device for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 is a diagrammatic, perspective view of an advantageous rear spoiler device according to the invention;

FIG. 2 is a plan view of an upper shell of the rear spoiler device;

DETAILED DESCRIPTION OF THE INVENTION

Figure 3:
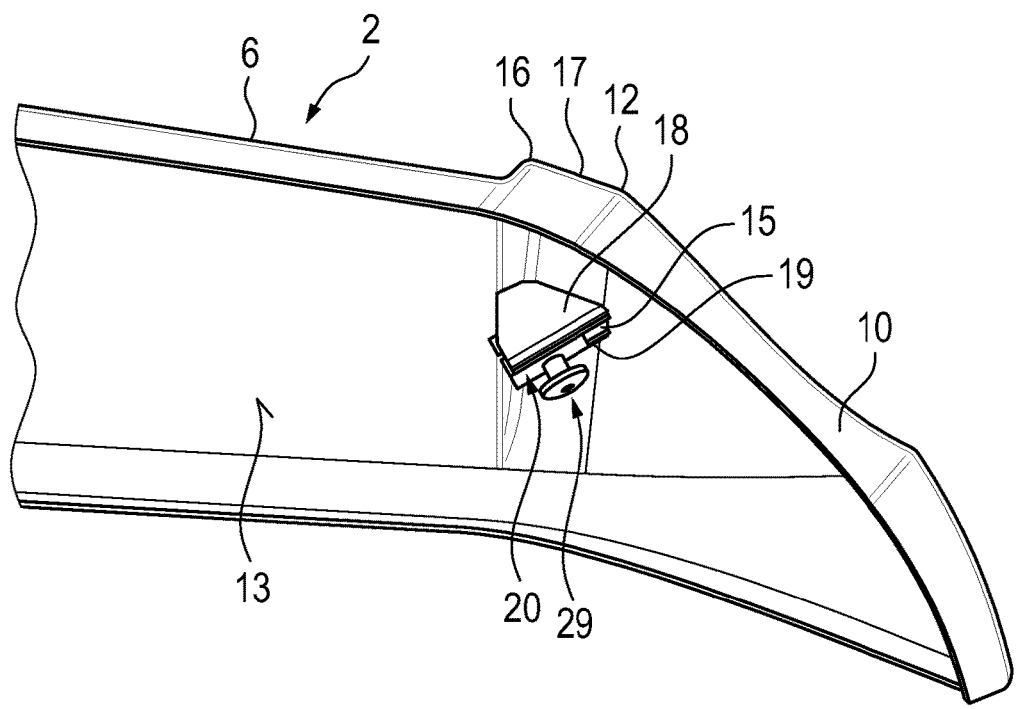
FIG. 3 is an enlarged, perspective view of the upper shell shown in FIG. 2.

Referring now to the figures of the drawings in detail and first, particularly to FIG. 1 thereof, there is shown a perspective view an advantageous rear spoiler device 1 for a motor vehicle, not shown here. The rear spoiler device 1 in the present case has an upper shell 2 and a carrier element 3, the upper shell 2 being fastened thereto. Optionally a taillight 4 for the motor vehicle is also arranged in an integrated manner in the carrier element 3.

The rear spoiler device 1, in particular the upper shell 2, forms on its upwardly facing free upper surface an air-guiding outer wall 5 which is subjected to driving wind when mounted as intended on the motor vehicle and which is subjected to stress thereby. The upper shell 2 has in this case a central main part 6 which extends longitudinally from a leading edge 7 to a trailing edge 8, wherein the trailing edge 8 is assigned the taillight 4. The main part 6 also extends in the width direction from a first side part 9 to a second side part 10, wherein the side parts 9, 10 are oriented in each case so as to be inclined relative to the main part 6, such that the upper shell 2 as a whole is of U-shaped configuration. The side parts 9, 10 are configured integrally with the main part 6, so that in each case a folded edge 11, 12 is produced on the connecting region between the side parts 9, 10 and the main part 6. The folded edge in each case extending in the longitudinal extension of the upper shell 2 in order to continue the roof line of the motor vehicle, for example.

FIG. 2 shows a plan view in the longitudinal extension of the rear spoiler device 1 of the trailing edge 8 of the upper shell 2. The carrier element 3 in this case is not shown, so that the inner face 13 remote from the air-guiding outer wall 5 and/or facing the carrier element 3 is also identifiable. On the inner face 13 the upper shell 2 has two fastening tabs 14, 15 which are to be described in more detail hereinafter. The fastening tabs 14, 15 in this case are configured mirror-symmetrically on the upper shell 2 and are arranged in each case in the region of one of the folded edges 11, 12. The fastening tabs 14, 15 serve for fastening the upper shell 2 to the carrier element 3, in the present case by means of one respective screw connection, as is to be described in more detail hereinafter.

FIG. 3 shows relative thereto an enlarged view of the upper shell 2 of the rear spoiler device 1 in the region of the fastening tab 15 which is located in the region of the folded edge 12. The folded edge is a so called K-line of the upper shell 2. In this case, a further folded edge 16 is configured parallel to the folded edge 12, the further folded edge extending parallel to the folded edge 12 so that the inclination of the side part 10 relative to the main part 2 is implemented in two stages, wherein a strip-shaped transition portion 17 which extends in the longitudinal direction of the upper shell 2 is thus formed between the side part 10 and the main part 6.

The fastening tab 15 extends along the folded edge 12, as visible in FIG. 3, and is configured integrally with the upper shell 2. As the fastening tab 15 extends not only parallel but directly along the folded edge 12, the situation is avoided that sink marks are produced on the visible outer face and/or air-guiding outer wall 5 during production, in particular during the injection-molding of the upper shell 2.

Figure 4:
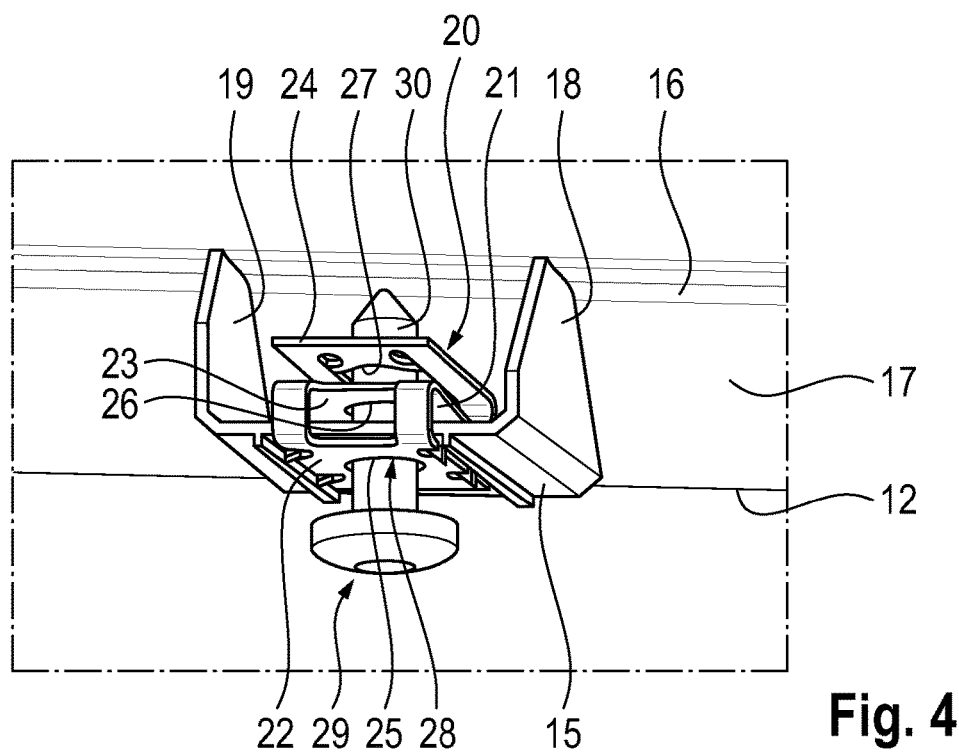
FIG. 4 is a detailed, perspective view of a connecting point of the upper shell of FIGS. 2 and 3.

The fastening tab 15 is assigned two support tabs 18 and 19 which are to be described in more detail relative to FIG. 4. FIG. 4 shows in a perspective view a plan view of the fastening tab 15 which extends along the folded edge 12. The support tabs 18 and 19 are oriented substantially parallel to one another and pass from the fastening tab 15 to the inner face 13 of the upper shell 2 such that they bear against the strip-shaped portion 17 and against the folded edges 12 and 16 as shown in FIGS. 3 and 4. In particular, the support tabs 18, 19 as well as the fastening tab 15 are integrally configured with the upper shell 2, and thus also integrally with the fastening tab 15, such that the fastening tab 15 together with the support tabs 18, 19 form a U-shaped fastening point, in particular a fastening dome which is configured integrally with the upper shell 2.

In the present case a cage nut 20 is also retained on the fastening tab 15. The cage nut 20 is configured as a metal strip or sheet metal strip which is curved in an S-shaped manner and which due to the S-shape forms a receiver 21 for the fastening tab, so that the cage nut 20 together with the receiver 21 may be pushed onto the fastening tab 15 as shown in FIG. 4. Due to the S-shape, the cage nut 20 has portions 22, 23 and 24 which are approximately parallel to one another and spaced apart from one another, wherein the receiver 21 is located between the portions 22 and 23. According to the present exemplary embodiment, the two portions 23 and 24 are located between the fastening tab 15 and the inner face 13 of the upper shell 2. All three portions 22, 23, 24 in each case have an opening 25, 26 and 27, the openings being configured so as to be aligned or slightly offset relative to one another. The fastening tab 15 also has an opening 28. The openings 25 to 28 serve to receive the shank of a fastening screw 29. During the mounting process, the fastening screw is pushed with a threaded shank 30 through the openings 25 to 28, wherein due to the offset arrangement of the openings 26 and 27 the thread of the fastening screw 29 cooperates with the portions 23 and 24 such that, by twisting the screw, the portions 23, 24 act as threaded portions and the fastening screw 29 is able to be screwed in thereby. Alternatively, the cage nut 20 bears a screw nut on the side of the fastening tab 15 facing the inner face 13, the fastening screw 29 being able to be screwed therein. It is also conceivable to configure a screw thread directly in the fastening tab 15, the fastening screw 29 being able to be screwed therein or being screwed therein.

Figure 5:
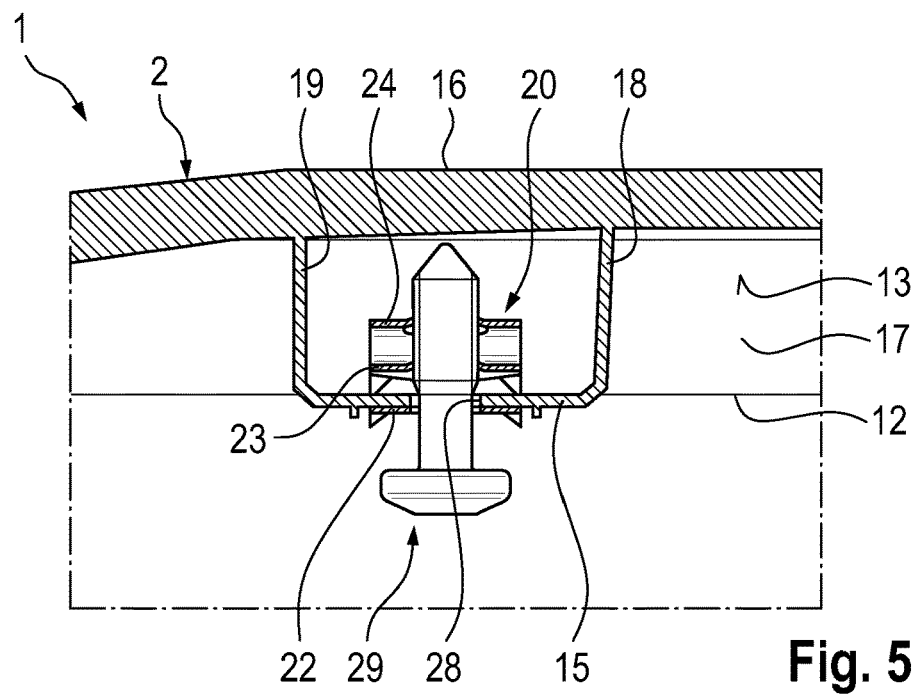
FIG. 5 is a longitudinal sectional view of the connecting point shown in FIG. 4.

FIG. 5 shows in a longitudinal sectional view the above-described fastening point, with the fastening tab 15 in a plan view of the side part 10. In this case it may be identified how the fastening screw cooperates with the portions 23, 24 of the cage nut 20 of FIG. 4.

Figure 6:
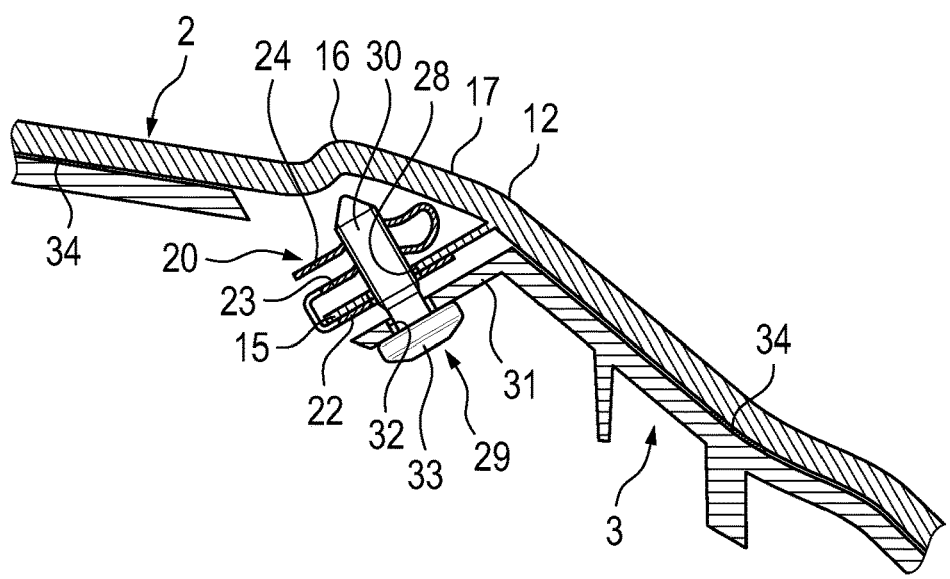
FIG. 6 is a cross-sectional view of the connecting point of FIG. 4.

FIG. 6 shows the same connecting point in a cross-sectional view in which the carrier element 3 is now also shown. The carrier element 3 has a retaining tab 31 which is assigned to the fastening tab 15 and which in the mounted state extends parallel to the fastening tab 15 and has an opening 32 which is aligned with the opening 28 in the fastening tab 15 so that the fastening screw with the threaded shank 30 may also be guided through the opening 32, such that a screw head 33 of the fastening screw 29 comes to bear against the retaining tab 31 of the carrier element 3, and by being screwed into the cage nut 20 thus fastens the carrier element 3 to the upper shell 2 and/or vice versa.

Optionally the carrier element 3 is additionally retained on the upper shell 2 by one or more adhesively bonded connections 34.

LIST OF REFERENCE NUMERALS

1 Rear spoiler device
2 Upper shell
3 Carrier element
4 Tail light
5 Air-guiding outer wall
6 Main part
7 Leading edge
8 Trailing edge
9 Side part
10 Side part
11 Folded edge
12 Folded edge
13 Inner face
14 Fastening tab
15 Fastening tab
16 Folded edge
17 Transition portion
18 Support tab
19 Support tab
20 Cage nut
21 Receiver
22 Portion
23 Portion
24 Portion
25 Opening
26 Opening
27 Opening
28 Opening
29 Fastening screw
30 Threaded shank
31 Retaining tab
32 Opening
33 Screw head
34 Adhesively bonded connection

The invention claimed is:

1. A rear spoiler for a motor vehicle, comprising:
an upper shell having an air-guiding outer wall, said upper shell extending longitudinally from a leading edge to a trailing edge and having a central main part and two side parts, said side parts being oriented so as to be inclined relative to said main part and are integrally connected to said main part on a longitudinally extending folded edge;
a carrier element being fastenable to the motor vehicle and having at least one retaining tab for fastening to said upper shell; and
a fastening tab, protruding in a direction of said at least one retaining tab of said carrier element and extending along said folded edge, is disposed on an inner face of said upper shell remote from said air-guiding outer wall.

2. The rear spoiler according to claim 1, wherein said fastening tab is integrally configured with said upper shell.

3. The rear spoiler according to claim 1, wherein said fastening tab extends only partially along said folded edge.

4. The rear spoiler according to claim 1, wherein said fastening tab extends parallel to said at least one retaining tab of said carrier element.

5. The rear spoiler according to claim 1, further comprising two lateral support tabs, said fastening tab is assigned said two lateral support tabs which extend perpendicular to said folded edge from said upper shell in a direction of said carrier element, so that said fastening tab forms a U-shaped profile with said two lateral support tabs.

6. The rear spoiler according to claim 5, wherein said fastening tab is integrally configured with said two lateral support tabs.

7. The rear spoiler according to claim 1, wherein said fastening tab and said at least one retaining tab are connected together by a screw connection.

8. The rear spoiler according to claim 1, wherein:
said fastening tab has a screw thread and said at least one retaining tab has an opening formed therein which is aligned with said screw thread for receiving a threaded shank on said fastening tab; or said screw thread is configured in said at least one retaining tab and said opening is configured in said fastening tab.

9. The rear spoiler according to claim 8, wherein said screw thread is integrally configured with said fastening tab or is fastened as a separate element to said fastening tab.

10. The rear spoiler according to claim 1, further comprising a cage nut disposed on said fastening tab.

\* \* \* \* \*